United States Patent [19]
Moriyama

[11] Patent Number: 6,055,475
[45] Date of Patent: Apr. 25, 2000

[54] TRANSMISSION CONTROL APPARATUS FOR CONTROLLING AN AUTOMATIC TRANSMISSION BASED ON INTERPOLATION OF A CURRENT OPERATING STATE, AND CORRESPONDING METHOD

[75] Inventor: Eiji Moriyama, Okazaki, Japan

[73] Assignee: Mitsubishi Jidosha Kogyo Kabushiki Kaisha, Tokyo, Japan

[21] Appl. No.: 08/999,146

[22] Filed: Dec. 24, 1997

[30] Foreign Application Priority Data

Dec. 26, 1996 [JP] Japan .................................. 8-348692

[51] Int. Cl.$^7$ ........................... F16H 61/08; B60K 41/00
[52] U.S. Cl. .................................. 701/56; 701/65; 477/97
[58] Field of Search .................. 701/51, 56, 59, 701/65; 477/97

[56] References Cited

U.S. PATENT DOCUMENTS

| | | | |
|---|---|---|---|
| 5,014,575 | 5/1991 | Fujiwara et al. | 477/61 |
| 5,115,694 | 5/1992 | Sasaki et al. | 477/98 |
| 5,216,606 | 6/1993 | Lentz et al. | 701/66 |
| 5,275,069 | 1/1994 | Baba et al. | 74/844 |
| 5,743,826 | 4/1998 | Usuki et al. | 477/98 |
| 5,752,210 | 5/1998 | Kato et al. | 701/51 |

*Primary Examiner*—Michael J. Zanelli
*Attorney, Agent, or Firm*—Birch, Stewart, Kolasch, & Birch, LLP

[57] ABSTRACT

In a transmission control apparatus and a transmission control method for an automatic transmission, when a detection point is defined in accordance with results of detection by means of a fluid temperature detecting element and a rotational speed detecting element, a plurality of points that surround the detection point are selected among a plurality of preset points. Control values for a control parameter are previously mapped corresponding to the set points, and the control values corresponding to the selected points are read from the resulting map. The controlled variable of the control parameter corresponding to the detection point is appropriately linearly calculated by interpolating the control values. Further, a learning correction value for the control parameter corresponding to the detection point is calculated, and is reflected in the control values for the selected points. Accordingly, even in a situation such that an engine speed and a line pressure are low, as in the case of a shift from the N-range to the D- or R-range, coast-downshift, power-off upshift, etc., the controlled variable of the control parameter can always be adjusted to an appropriate value without regard to dispersion of the hydraulic characteristics attributable to variation in workmanship between individual automatic transmissions or the level of the fluid temperature. Thus, lowering of shift response and shift shock during transmission control can be prevented securely.

21 Claims, 15 Drawing Sheets

FIG. 14

Tfbij

| | Ne₁ | Ne₂ | Ne₃ | Ne₄ |
|---|---|---|---|---|
| T_A1 | Tfb11 | Tfb12 | Tfb13 | Tfb14 |
| T_A2 | Tfb21 | Tfb22 | Tfb23 | Tfb24 |
| T_A3 | Tfb31 | Tfb32 | Tfb33 | Tfb34 |
| T_A4 | Tfb41 | Tfb42 | Tfb43 | Tfb44 |
| T_A5 | Tfb51 | Tfb52 | Tfb53 | Tfb54 |

FIG. 15

Tflij

| | Ne₁ | Ne₂ | Ne₃ | Ne₄ |
|---|---|---|---|---|
| T_A1 | Tfl11 | Tfl12 | Tfl13 | Tfl14 |
| T_A2 | Tfl21 | Tfl22 | Tfl23 | Tfl24 |
| T_A3 | Tfl31 | Tfl32 | Tfl33 | Tfl34 |
| T_A4 | Tfl41 | Tfl42 | Tfl43 | Tfl44 |
| T_A5 | Tfl51 | Tfl52 | Tfl53 | Tfl54 |

DAij

| | Ne1 | Ne2 | Ne3 | Ne4 |
|---|---|---|---|---|
| TA1 | DA11 | DA12 | DA13 | DA14 |
| TA2 | DA21 | DA22 | DA23 | DA24 |
| TA3 | DA31 | DA32 | DA33 | DA34 |
| TA4 | DA41 | DA42 | DA43 | DA44 |
| TA5 | DA51 | DA52 | DA53 | DA54 |

# TRANSMISSION CONTROL APPARATUS FOR CONTROLLING AN AUTOMATIC TRANSMISSION BASED ON INTERPOLATION OF A CURRENT OPERATING STATE, AND CORRESPONDING METHOD

BACKGROUND OF THE INVENTION

1. Field of the Invention

The present invention relates to a transmission control apparatus and a transmission control method for an automatic transmission, and more specifically, to a technique for preventing lowering of shift response and shift shock that are attributable to fluctuations of the temperature of an automatic transmission fluid and the like.

2. Description of the Related Art

In general, an automatic transmission for a vehicle is furnished with a planetary gear, which includes power transmission elements such as a sun gear, planetary carrier, etc., and a transmission mechanism, which includes a plurality of hydraulic frictional engagement elements (frictional elements for engagement) such as a wet-type hydraulic multiple plate clutch, hydraulic band brake, etc. In this automatic transmission, a line pressure generated by a hydraulic pump that is driven by means of the crankshaft of an engine is used as a drive source for the frictional engagement elements. The transmission is connected with an electronic control unit, which controls a hydraulic pressure supplied to and discharged from the frictional engagement elements associated with change of gear, thereby controlling the respective operating states of the engagement elements. Thus, an engine torque transmission path for the planetary gear changes, whereupon a desired transmission gear ratio is established.

In the automatic transmission of this electronic-control type, a solenoid-operated hydraulic control valve (hereinafter referred to as solenoid valve) is used for the control of the operating states of the hydraulic frictional engagement elements. More specifically, the hydraulic pressure supply to or discharge from the engagement elements is controlled by regulating the on-off duty ratio of the solenoid valve, whereby the elements are engaged or disengaged. Thus, in making change of gear, a shift shock on the frictional engagement elements being engaged or disengaged is reduced by changing the element to be engaged, that is, by engaging one of those elements associated with the gear change while disengaging the other.

In an upshift from the second-gear speed to the third-gear speed, for example, the frictional engagement element (release-side element) for the second-gear speed is disengaged, while the engagement element (connection-side element) for the third-gear speed is engaged. By thus replacing the engagement element to be engaged, the engine torque transmission path can be smoothly changed to complete the upshift.

A wet-type hydraulic multiple plate clutch is widely used as one such frictional engagement element. This clutch includes drive plates and driven plates arranged alternately, a clutch piston, and a return spring for urging the piston toward a return position. When a hydraulic pressure is supplied to the clutch piston, the piston moves against the urging force of the return spring, thereby pressing the adjacent plates against one another, so that the clutch is engaged. When the hydraulic pressure supply to the piston is stopped, the piston is returned by means of the urging force of the return spring, so that the adjacent plates are separated from one another to disengage the clutch.

In the wet-type hydraulic multiple plate clutch, the drive and driven plates are placed in an automatic transmission fluid (ATF). If the plates are located close to one another, drag torque is generated between the adjacent plates even when the clutch is disengaged or released. To avoid this, the clutch is designed so that a required clearance is formed between each two adjacent plates when it is released. If the moving speed of the clutch piston is too low, therefore, the engagement of the clutch takes much time, so that the shift response is lowered. If the moving speed of the piston is too high, in contrast with this, the clutch is engaged so suddenly that a great shift shock is generated.

Generally, therefore, "(dead stroke) elimination" is effected such that the solenoid valve is fully opened to increase oil supply to the clutch piston, thereby enabling the piston to move at a relatively high speed, in a dead stroke section of the piston before the start of engagement. When this elimination is completed, the oil supply to the piston is feedback-controlled so that the degree of engagement of the piston is enhanced gradually. Thus, the shift response is improved, and the shift shock is reduced.

The hydraulic pump rotates in synchronism with the crankshaft of the engine, so that the line pressure, in general, is lower than a specified value during idle operation or the like in which the engine rotates at low speed. Owing to variation in workmanship between individual automatic transmissions, moreover, hydraulic characteristics are subject to dispersion. Referring to FIG. 18, there are shown the hydraulic characteristics that depend on the variation in workmanship between individual automatic transmissions. In FIG. 18, the full line represents the median of the hydraulic characteristics, while the broken line and dashed line represent values of deflection attributable to the variation between the individuals. As seen from FIG. 18, the hydraulic characteristics of the individual automatic transmissions are subject to dispersion in the region where the engine speed is low.

If the hydraulic characteristics are subject to dispersion corresponding to the variation or difference in workmanship between the individual automatic transmissions, the line pressure of one transmission differs from that of another, in a shift from a low-speed engine state with the throttle fully restored, e.g., a shift from the N-range to the D- or R-range, coast-downshift, power-off upshift, etc. Inevitably, therefore, time for the dead stroke elimination is inappropriate, and the shift response is lowered.

As is generally known, moreover, the viscosity of the ATF increases at a low temperature such as one immediately after cold start, and lowers at a high temperature such as one after high-speed driving. Thus, the leakage of the ATF from individual sliding parts in the transmission varies, thereby causing the line pressure to fluctuate, depending on the ATF temperature. Referring to FIG. 19, there are shown the hydraulic characteristics that depend on the fluid temperature. In FIG. 19, the full line represents the median of the line pressure after warm-up, while the broken line and dashed line represent values of deflection attributable to fluctuations of the fluid temperature. As seen from FIG. 19, the hydraulic characteristics also vary depending on the fluid temperature.

If the line pressure thus changes with the fluid temperature, it becomes so low at high temperature that the dead stroke elimination cannot be achieved satisfactorily in a fixed time. Accordingly, the start of connection of the clutch is delayed, so that the shift response worsens. At low temperature, on the other hand, the line pressure becomes so high that the dead stroke is suddenly eliminated, and the engagement rapidly advances, inevitably causing a shift shock.

In order to solve the above problem, a learning correction method has been proposed such that the engine speed and the ATF temperature are divided into regions in a low engine speed range such as one for idle operation, appropriate elimination times are set individually for these regions and stored in the electronic control unit, and the stored values are subjected to learning correction for the individual regions.

According to this method of division, however, the engine speed and the ATF temperature have a certain width each, so that learning correction values may possibly fluctuate within one region if the elimination times are subjected to learning correction for the individual regions. To be exact, therefore, the appropriate elimination time for the case where both the engine speed and the ATF temperature are relatively low is different from that for the case where both these variables are relatively high, even though in the same region. Accordingly, the learning correction values vary with every execution of transmission control. If the learning correction values thus vary in the same region, the elimination times never converge, so that a shift shock is also caused.

In this case, each divided region may possibly be subdivided. If this is done, however, massive data must be stored in the control unit.

SUMMARY OF THE INVENTION

The object of the present invention is to provide a transmission control apparatus and a transmission control method for an automatic transmission, capable of easily securely preventing lowering of shift response and shift shock that are attributable to fluctuations of the temperature of an automatic transmission fluid and the like.

The above object is achieved by a transmission control apparatus or a transmission control method according to the present invention, which comprises: a hydraulic pressure control element for controlling by means of a control parameter a hydraulic pressure supplied to a frictional element for engagement, whereby a predetermined transmission stage for the automatic transmission is established; a fluid temperature detecting element for detecting the fluid temperature of the automatic transmission; a rotational speed detecting element for detecting the rotational speed of the engine or a hydraulic pump for generating the hydraulic pressure; a storage element for storing, in the form of a map, control values for the control parameter corresponding to a plurality of set points set in accordance with the fluid temperature of the automatic transmission and the rotational speed of the engine or the hydraulic pump; a selection element for defining a detection point on the map in accordance with results of detection by means of the fluid temperature detecting element and the rotational speed detecting element and selecting those points, among the set points, which surround the detection point; and a controlled variable calculation element for obtaining control values for the selected points from the map and calculating the controlled variable of the control parameter corresponding to the detection point by interpolating the control values.

Thus, when the detection point is defined in accordance with the results of detection by means of the fluid temperature detecting element and the rotational speed detecting element, the points that surround the detection point are selected among the preset points. The control values for the control parameter are previously mapped corresponding to these set points, and the control values corresponding to the selected points are first read from the map. The controlled variable of the control parameter corresponding to the detection point is appropriately linearly calculated by interpolating the control values.

Thus, even in a situation such that the engine speed and the line pressure are low, as in the case of a shift from the N-range to the D- or R-range, coast-downshift, power-off upshift, etc., the controlled variable of the control parameter can always be adjusted to an appropriate value without regard to dispersion of the hydraulic characteristics attributable to variation in workmanship between individual automatic transmissions or fluctuations of the fluid temperature. Thus, lowering of shift response and shift shock during transmission control can be prevented securely.

Preferably, the control parameter is a time during which the piston dead stroke of the frictional element for engagement is eliminated. Thus, the time for the elimination of the piston dead stroke, which greatly influences the transmission control, can always be adjusted to an appropriate value, so that lowering of shift response and shift shock during the transmission control can be prevented securely with ease.

Preferably, moreover, the hydraulic pressure control element comprises a dead stroke elimination element for eliminating the piston dead stroke of the frictional element for engagement by supplying a total pressure to the frictional element and a given hydraulic pressure supply element for supplying a given hydraulic pressure to the frictional element for engagement after the piston dead stroke is eliminated, and the control parameter is the given hydraulic pressure.

Thus, the given hydraulic pressure (initial-engagement-stage duty ratio), which greatly influences the transmission control, can always be adjusted to an appropriate value, so that lowering of shift response and shift shock during the transmission control can be prevented securely with ease.

Preferably, moreover, the controlled variable calculation element comprises a learning correction element for calculating a learning correction value for the control parameter corresponding to the detection point and reflecting the learning correction value in the control values for the selected points, and the controlled variable calculation element calculates the controlled variable of the control parameter by interpolating the control values reflective of the learning correction value.

Thus, when the transmission control is carried out, the learning correction value for the control parameter corresponding to the detection point is calculated, and is reflected in the control values for those points around the detection point which are selected this time. In the case where those points selected this time are selected again when the next cycle of transmission control is carried out, the controlled variable of the control parameter for the detection point to be interpolated can be adjusted to an appropriate value, so that lowering of shift response and shift shock during the transmission control can be prevented more securely.

Preferably, furthermore, the learning correction element calculates the learning correction value in accordance with a time interval between the point of time that the piston dead stroke of the frictional element for engagement is eliminated and the time for the start of actual gear change.

The period between the point of time that the piston dead stroke of the frictional element for engagement is eliminated and the time for the start of actual gear change directly influences the shift response of the transmission control and shift shock. Accordingly, the learning correction value for the controlled variable of the control parameter can be calculated in a manner such that this period is substantially fixed, so that learning correction can be carried out very satisfactorily and appropriately. Thus, the start of engagement of the frictional element for engagement can be restrained from being too late or too early, so that lowering of shift response and shift shock during the transmission control can be prevented securely.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 14 is a basic time map used in the N-D shift control;

FIG. 15 is a correction time map used in the N-D shift control;

DETAILED DESCRIPTION OF THE PREFERRED EMBODIMENTS

Figure 1:
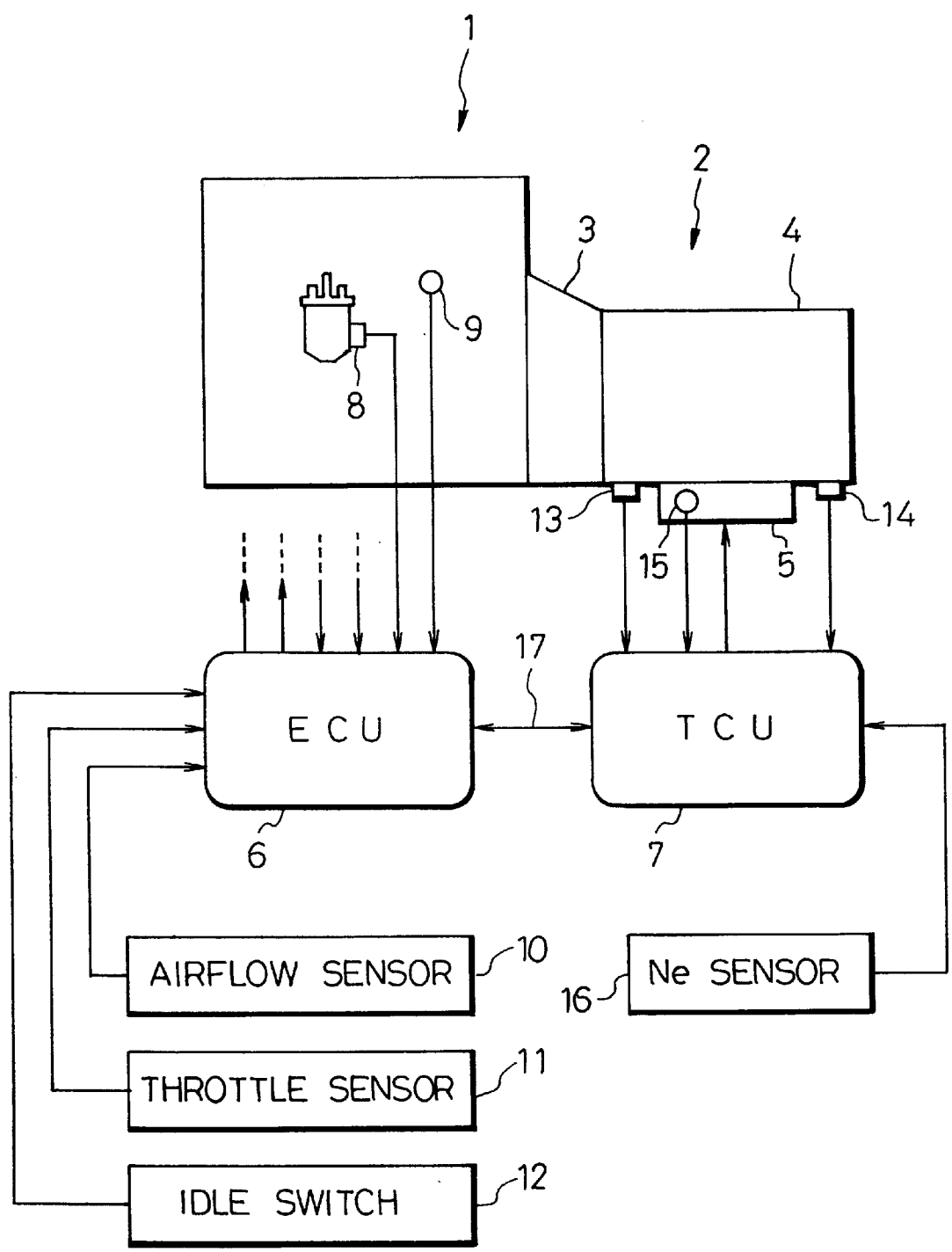
FIG. 1 is a diagram showing an outline of a power train to which a transmission control apparatus according to the present invention is applied.

FIG. 1 shows an outline of a power train of a passenger car to which a transmission control apparatus according to the present invention is applied. In FIG. 1, numeral 1 denotes an automotive gasoline engine (hereinafter referred to simply as engine). An automatic transmission 2 of the four-forward-speed type is connected to the rear end of the engine 1, and an output is transmitted to a driving wheel (not shown) through the transmission 2. The automatic transmission 2 is composed of a torque converter 3, transmission body 4, and hydraulic pressure controller 5. The transmission body 4 has therein hydraulic frictional engagement elements (frictional elements for engagement), such as a hydraulic clutch, hydraulic brake, etc., as well as a plurality of planetary gear sets. The hydraulic pressure controller (hydraulic pressure control element) 5 contains a plurality of solenoid valves for hydraulic pressure control, as well as an integral hydraulic circuit. The engine 1 and the automatic transmission 2 are drivingly controlled by means of an engine control unit (ECU) 6 and a transmission control unit (TCU) 7, respectively. The ECU 6 and the TCU 7 each include input and output devices, storage devices (ROM, RAM, BURAM, etc.) stored with a large number of control programs, central processing unit (CPU), timer counter, etc., none of which are shown in FIG. 1.

The input side of the ECU 6 is connected with various sensors and switches (not shown), as well as a crank angle sensor 8 for detecting an engine speed Ne and the crank angle of each cylinder, water temperature sensor 9 for detecting a cooling water temperature $T_W$, airflow sensor 10 for detecting an intake air flow rate $Q_A$, throttle sensor 11 for detecting a throttle opening $\theta_{TH}$, idle switch 12 for detecting a fully-closed state of a throttle valve, etc. On the other hand, the input side of the TCU 7 is connected with various sensors and switches, such as an inhibitor switch, as well as an $N_T$ sensor 13 for detecting a rotational speed (input shaft speed) $N_T$ of the turbine shaft of the torque converter 3, $N_O$ sensor 14 for detecting a transfer drive gear speed $N_O$ in place of a vehicle velocity V, fluid temperature sensor 15 for detecting the temperature of an automatic transmission fluid (ATF), Ne sensor 16 for detecting the engine sped Ne from ignition pulses, etc. The ECU 6 and the TCU 7 are connected by means of a signal cable 17, and exchange information with each other through serial communication. The ECU 6 generally controls the engine 1 for its fuel injection quantity, ignition timing, etc. in accordance with various pieces of input information. Base on input information, moreover, the TCU 7 causes the hydraulic pressure controller 5 to drive the hydraulic frictional engagement elements in the transmission body 4, thereby effecting transmission control of the automatic transmission 2.

Figure 2:
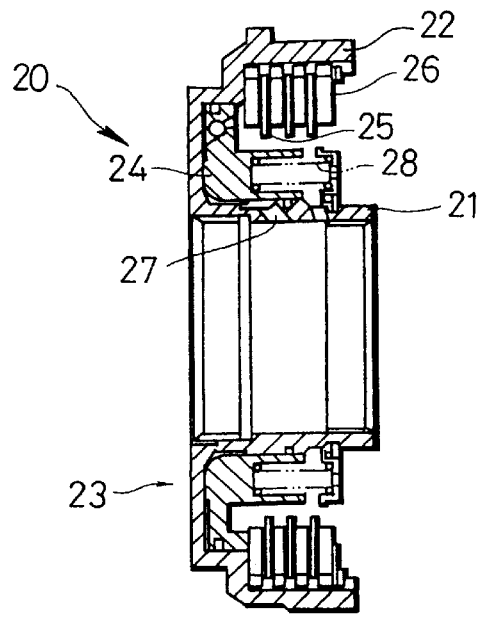
FIG. 2 is a profile showing a hydraulic clutch.

Referring to FIG. 2, there is shown a sectional view of a connection-side hydraulic clutch (frictional element for engagement) 20 for D-range establishment. The clutch 20 has a clutch drum 23 in the form of a bottomed double cylinder, including an inner cylinder 21 and an outer cylinder 22. Ring-shaped drive plates 25 and driven plate 26 alternately stacked in layers, as well as a disk-shaped clutch piston 24, are arranged in the drum 23 for axial sliding motion. A port 27 is bored through the inner cylinder 21 of the clutch drum 23. When the high-pressure ATF is fed into the drum 23 through the port 27, the clutch piston 24 moves forward to the right of FIG. 2. As a result, the drive and driven plates 25 and 26 are pressed against one another by the piston 24, whereby power is transmitted. A plurality of clutch springs 28 are interposed between the inner cylinder 21 of the drum 23 and the inner surface of the clutch piston 24. When the pressure of the ATF is lowered, the piston 24 is urged by the springs 28 to move backward to the left of FIG. 2.

Figure 3:
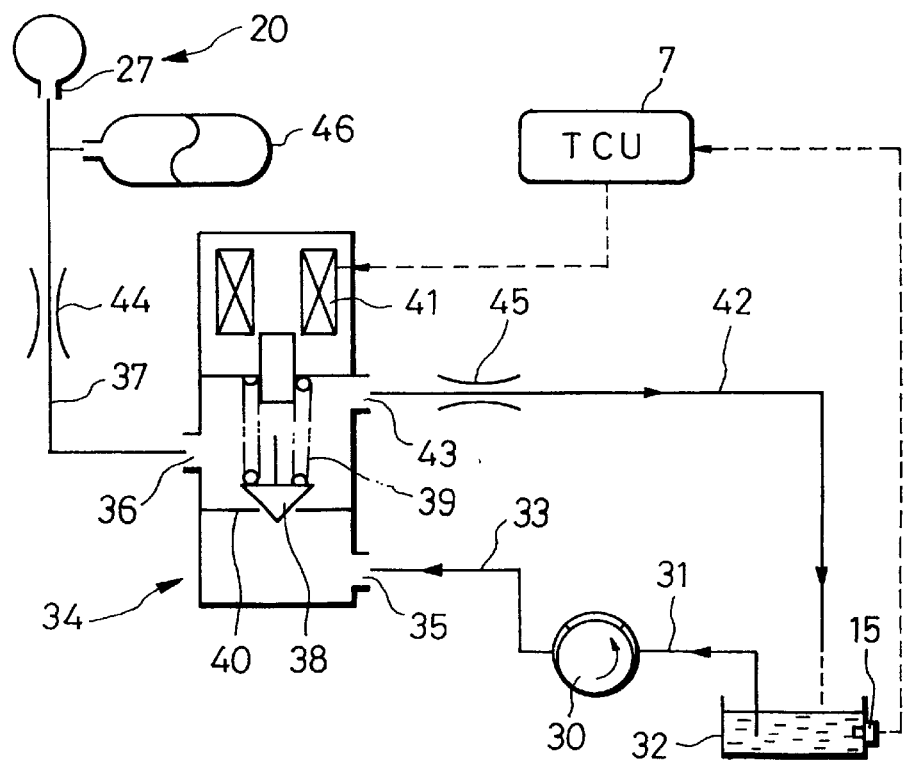
FIG. 3 is a diagram showing a hydraulic circuit for operating the hydraulic clutch.

Referring to FIG. 3, there is shown a hydraulic circuit for driving the hydraulic clutch 20. A hydraulic pump 30 rotates integrally with a crankshaft of the engine 1, and sucks in the ATF from an oil pan 32 through an oil tube 31, thereby generating a hydraulic pressure. The pump 30 is connected to a first port 35 of a solenoid valve 34, a hydraulic control valve, by means of an oil tube 33. The discharge pressure of the pump 30 is regulated as a line pressure by means of a pressure governor valve (not shown) or the like in the oil tube 33, and is fed to the first port 35. A second port 36 of the solenoid valve 34 is connected to the hydraulic clutch 20 by means of an oil tube 37. The line pressure is supplied to the clutch 20 as a valve plug 38 in the valve 34 is lifted.

The valve plug 38 of the solenoid valve 34, which is normally urged toward a valve seat 40 by means of a return spring 39, is lifted when it is attracted to a solenoid 41 that is energized by driving current from the TCU 7. The valve 34 is subjected to duty control at a given frequency (e.g., 50 Hz) by means of the TCU 7. The valve 34 is provided with a drain port 43, which continually communicates with the second port 36 and is connected to the oil pan 32 by means of an oil tube 42. The oil tubes 37 and 42 are provided with orifices 44 and 45, respectively. The flow area of the orifice 44 of the oil tube 37 is wider than that of the orifice 45 of the oil tube 42. Further, an accumulator 46 is located in that portion of the oil tube 37 between the hydraulic clutch 20 and the orifice 44.

The following is a description of dead stroke elimination for the connection-side hydraulic frictional engagement elements and transmission control thereafter to be carried out after shift operation from the N-range to the D-range, for example.

Figure 4:
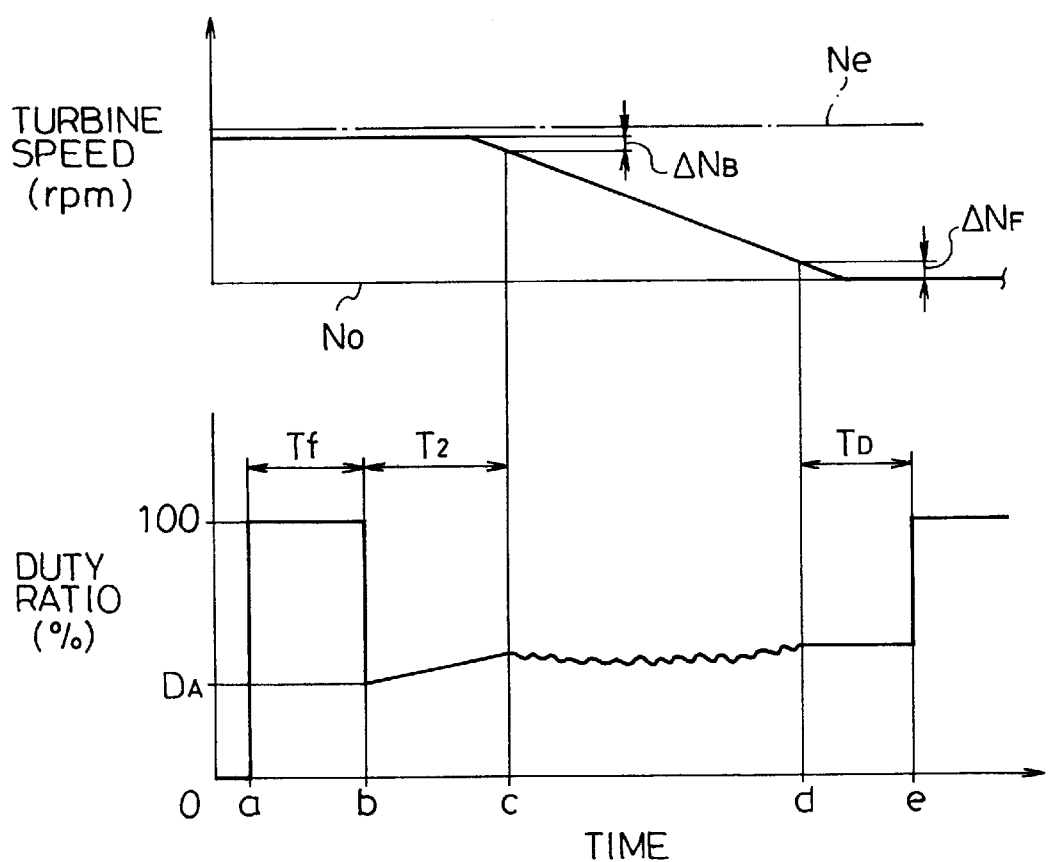
FIG. 4 is a time chart showing time-based changes of the turbine speed and the drive duty ratio of a solenoid valve observed when the hydraulic clutch is engaged.

Based on a control program mentioned later, the TCU 7 actuates the solenoid valve 34 with the following duty ratio during a time interval between the delivery of a gear change command and completion of gear change. The turbine speed $N_T$ and a duty ratio D of the valve 34 used during this time interval have the relation shown in the graph of FIG. 4, and drive control of the valve 34 is composed the following four stages. In the graph of FIG. 4, the axis of abscissa represents time.

First, in a first stage (between times a and b), dead stroke elimination control for the clutch piston 24 is started immediately when a gear change command for the D-range is outputted. More specifically, the solenoid valve 34 is fully opened with the drive duty ratio D at 100% for a period of time between an elimination starting time (time a) and an elimination ending time (time b), that is, for an elimination time (time for the elimination of a piston dead stroke) Tf. During this elimination period, the gear change is not started yet, so that the turbine speed $N_T$ is unchanged.

Then, in a second stage (between times b and c, that is, between the elimination of the piston dead stroke and the start of actual gear change), the drive duty ratio D is set at an initial-engagement-stage duty ratio (given hydraulic pressure) $D_A$, and is increased from this value at a predetermined rate. When transmission of torque is started with the hydraulic clutch 20 engaged as this is done, the turbine speed $N_T$ starts to lower. At a time c when the turbine speed is lowered to a given level, it is concluded that the gear change is started.

Then, in a third stage (between times c and d), the drive duty ratio D is subjected to feedback control such that the changing rate of the turbine speed $N_T$ is equal to a target turbine speed changing rate. When the deviation between the turbine speed $N_T$ and gear change end speed $N_O$ is reduced to a gear change end decision threshold value $\Delta N_F$ or less (time d), this stage terminates, whereupon a fourth stage is started.

In the fourth stage (between times d and e), the lapse of a standby time $T_D$ is awaited with the drive duty ratio D kept constant, and the turbine speed $N_T$ is deemed to be equal to the gear change end speed $N_O$ at the point of time (time e) for the lapse of the standby time. At this point of time, the drive duty ratio D is increased again to 100%, whereupon the N-D shift is finished.

Referring now to the flowcharts of FIGS. 5 to 12, steps of procedure for the above-mentioned control stages and learning correction for the elimination time will be described in detail.

When a vehicle driver moves the shift lever from the N-range to the D-range, a shift command signal is outputted in the TCU 7 (time a of FIG. 4), and an N-D shift control subroutine shown in FIGS. 5 to 11 is executed. When N-D shift control is started, the TCU 7 repeatedly executes this subroutine so that engagement of the hydraulic clutch 20 is completed.

Figure 5:
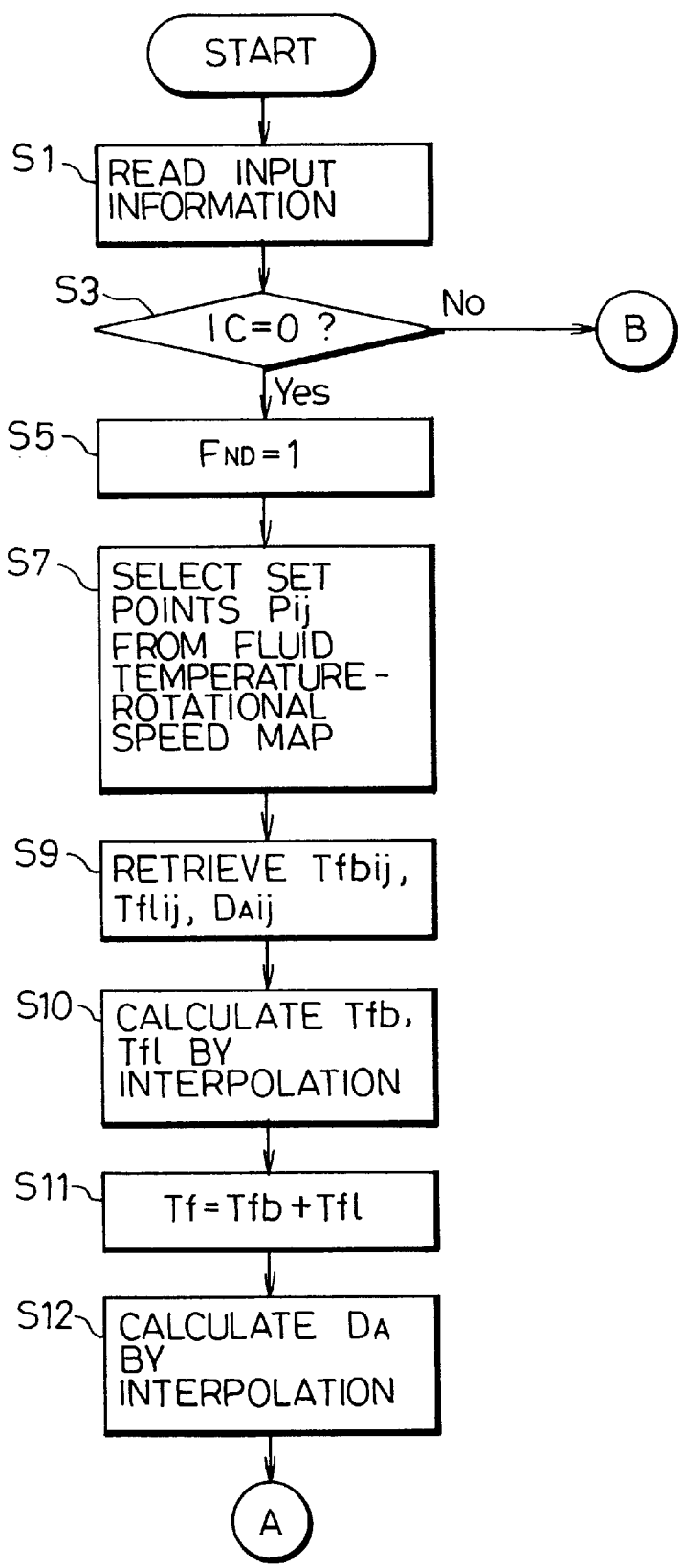
FIG. 5 is a part of a flowchart showing the procedure of an N-D shift control subroutine.

When the subroutine is started, the TCU 7 first reads input information from the aforementioned various sensors and the ECU 6 and stores the RAM therewith in Step S1 of FIG. 5. In Step S3, thereafter, the TCU 7 determines whether or not a program control variable IC is 0 (that is, whether or not the running process is a first process in the first stage). Since the initial value of this program control variable IC is 0, the TCU 7 advances to Step S5 and sets an N-D-shift-in-process flag $F_{ND}$ at 1 immediately after the start of control. The TCU 7 recognizes the N-D shift in process by this flag, and information to this effect is also transmitted to the ECU 6.

Figure 13:
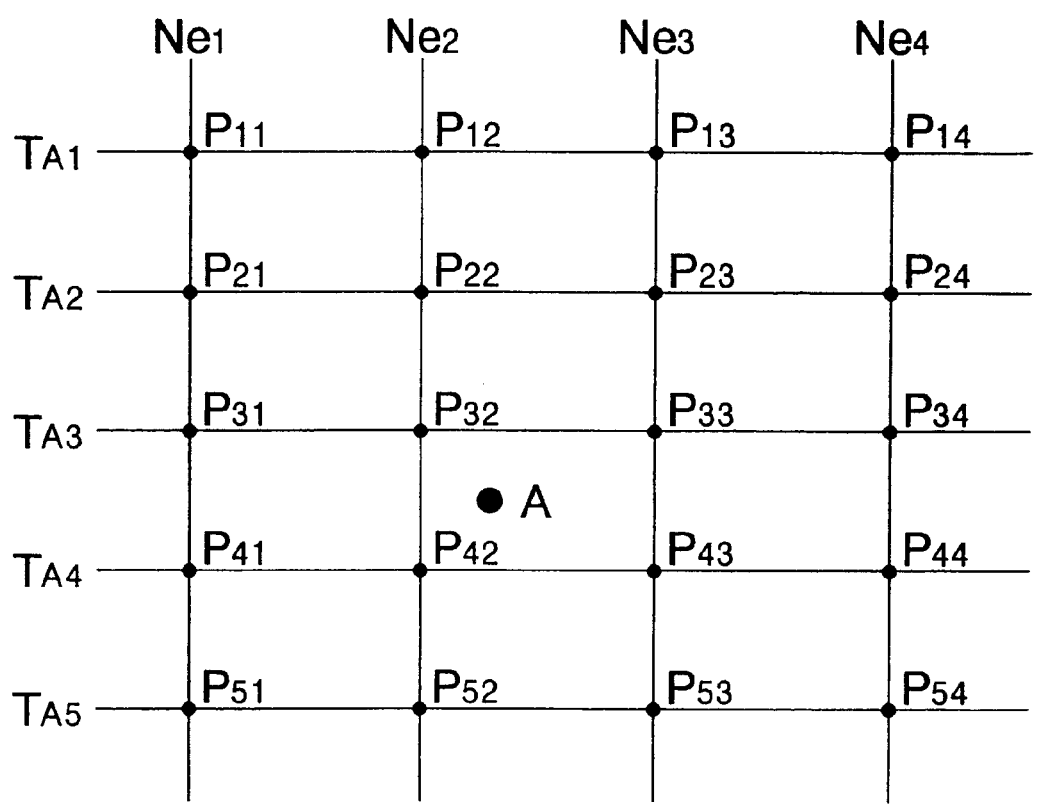
FIG. 13 is a fluid temperature-rotational speed map used in N-D shift control.

Then, in Step S7, the TCU 7 defines a point (detection point indicated by A in FIG. 13) corresponding to a present ATF temperature $T_{ATF}$ and engine speed Ne on a map (fluid temperature-rotational speed map) shown in FIG. 13 in accordance with input information from the fluid temperature sensor (fluid temperature detecting element) 15 and the Ne sensor (rotational speed detecting element) 16.

The following is a description of the fluid temperature-rotational speed map of FIG. 13. Previously set on this map are points Pij (i=1, 2, 3, 4, 5; j=1, 2, 3, 4), that is, points P11, P12, P13, P14, P21, . . . , P54), corresponding to given ATF temperatures $T_A$i (i=1, 2, 3, 4, 5), that is, $T_{A1}$ (e.g., 5° C.), $T_{A2}$ (e.g., 20° C.), $T_{A3}$ (e.g., 60° C.), $T_{A4}$ (e.g., 85° C.) and $T_{A5}$ (e.g., 110° C.), and given engine speeds Nej (j=1, 2, 3, 4), that is, Ne1 (e.g., 600 rpm), Ne2 (e.g., 700 rpm), Ne3 (e.g., 1,000 rpm) and Ne4 (e.g., 1,500 rpm). For convenience' sake, the points Pij in FIG. 13 are plotted so that the given ATF temperatures $T_A$i and the given engine speeds Nej are set at regular intervals. Usually, however, ATF temperatures $T_A$i and the engine speeds Nej are set at irregular intervals, as mentioned before.

In Step S7, those four set points Pij are selected which surround the detection point A and are situated nearest to the point A (selection element). More specifically, in this case, four points P32, P33, P42 and P43 that surround the detection point A are selected, as seen from FIG. 13.

Figures 16, 17:
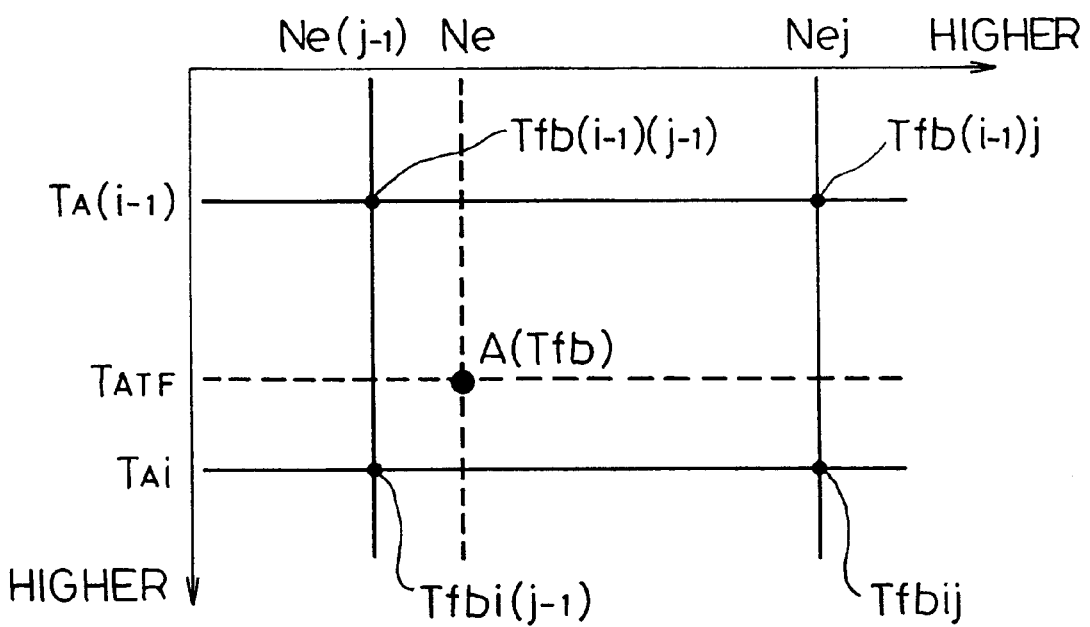
FIG. 16 is an initial duty ratio map used in the N-D shift control.
FIG. 17 is a diagram for illustrating interpolation.
Figure 18:
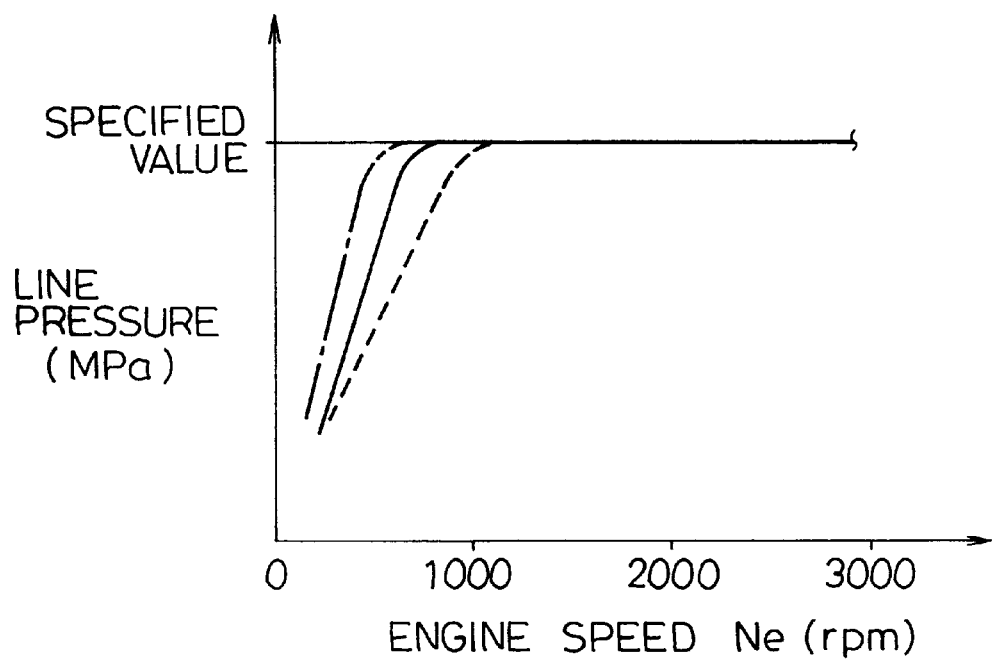
FIG. 18 is a graph showing dispersion of hydraulic pressure characteristics attributable to variation in workmanship between individual automatic transmissions.
Figure 19:
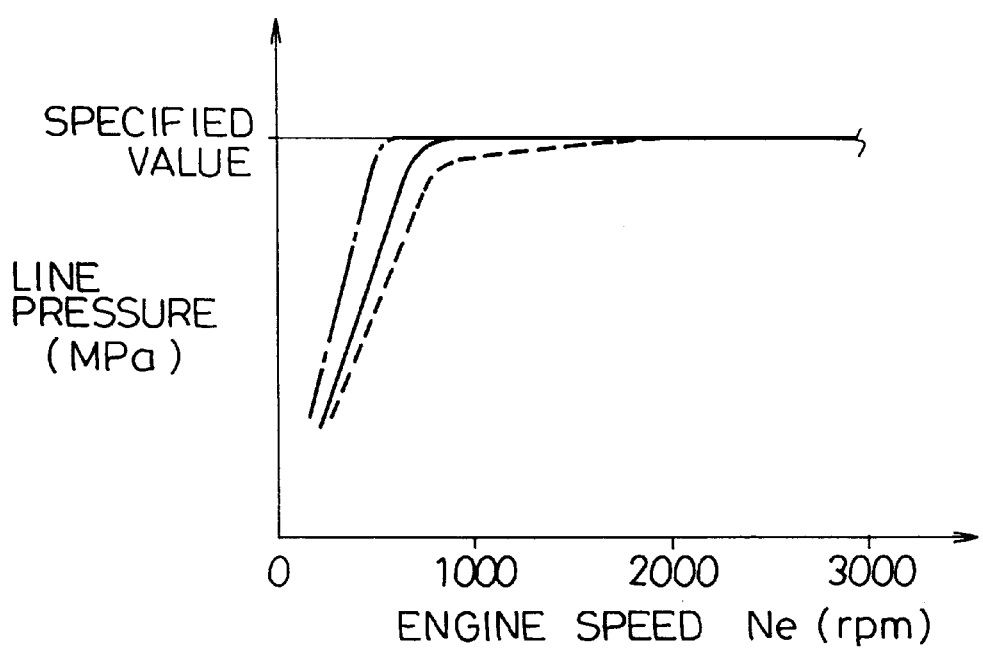
FIG. 19 is a graph showing change of the line pressure compared with the automatic transmission fluid temperature.

Initial elimination time values, that is, basic elimination times Tfbij (Tfb11, Tfb12, Tfb13, Tfb14, Tfb21, . . . , Tfb54), learning correction values for the basic elimination times Tfbij, that is, learning correction times Tflij (Tfl11, Tfl12, Tfl13, Tfl14, Tfl21, . . . , Tfl54), and initial duty ratios $D_A$ij ($D_A$11, $D_A$12, $D_A$13, $D_A$14, $D_A$21, . . . , $D_A$54) are previously obtained corresponding to the set points Pij by experiments or the like, as shown in the basic time map of FIG. 14, correction time map of FIG. 15, and initial duty ratio map of FIG. 16, individually (storage element).

Thus, when the four set points Pij surrounding the detection points A are selected, the TCU 7 reads the control values corresponding to the four set points Pij, that is, the basic elimination times Tfbij, learning correction times Tflij, and initial duty ratios $D_A$ij, from the basic time map, correction time map, and initial duty ratio map, respectively, in Step S9. More specifically, in this case, the TCU 7 reads basic elimination times Tfb32, Tfb33, Tfb42 and Tfb43, learning correction times Tfl32, Tfl33, Tfl42 and Tfl43, and initial duty ratios $D_A$32, $D_A$33, $D_A$42 and $D_A$43 corresponding to the points P32, P33, P42 and P43 from their corresponding maps. Based on experimental results and the like, the basic elimination times Tfbij and the initial duty ratios $D_A$ij are set so as to be longer or higher with the ATF temperature $T_{ATF}$ at a high level and the engine speed Ne at a low level, and shorter or lower with the ATF temperature $T_{ATF}$ at a low level and the engine speed Ne at a high level. When the vehicle is brand-new or immediately after its battery is attached or detached, all the learning correction times Tflij are reset at 0.

In Step S10 to follow, a basic elimination time Tfb for the detection point A is calculated from the basic elimination times Tfbij corresponding to the four set points Pi that surround the detection point A by interpolation (see FIG. 17), according to the following expression (controlled variable calculation element):

$$Tfb=Tfb1\cdot(NeJ-Ne)/(Nej-Ne(j-1))+Tfb2\cdot(Ne-Ne(j-1))/(Nej-Ne(j-1)),$$

where we have $$Tfb1=Tfb(i-1)(j-1)\cdot(T_Ai-T_{ATF})/(T_Ai-T_A(i-1))+Tfbi(j-1)\cdot(T_{ATF}-T_A(i-1))/(T_Ai-T_A(i-1)),$$

$$Tfb2=Tfb(i-1)j\cdot(T_Ai-T_{ATF})/(T_Ai-T_A(i-1))+Tfbij\cdot(T_{ATF}-T_A(i-1))/(T_Ai-T_A(i-1)),$$

Since the four set points Pij that surround the detection point A are P32, P33, P42 and P43, in this case, the basic elimination time Tfb for the detection point A is calculated according to the following expression in which subscripts i and j of the above expression are given by i=4 and j=3:

$$Tfb=Tfb1\cdot(Ne3-Ne)/(Ne3-Ne2)+Tfb2\cdot(Ne-Ne2)/(Ne3-Ne2),$$

where we have $$Tfb1=Tfb32\cdot(T_A4-T_{ATF})/(T_A4-T_A3)+Tfb42\cdot(T_{ATF}-T_A3)/(T_A4-T_A3),$$

$$Tfb2=Tfb33\cdot(T_A4-T_{ATF})/(T_A4-T_A3)+Tfb43\cdot(T_{ATF}-T_A3)/(T_A4-T_A3).$$

Also by interpolation, a learning correction time Tfl for the detection point A is calculated from the learning correction times Tflij corresponding to the four set points Pij that surround the detection point A (controlled variable calculation element). Since an expression similar to the aforesaid expression for the basic elimination time Tfb is used for the calculation of this value, a description of the expression for this case is omitted herein.

In Step S11, the elimination time (control parameter) Tf for the detection point A is calculated according to the following expression with use of the basic elimination time Tfb and the learning correction time Tfl obtained in the aforesaid manner by interpolation:

$$Tf=Tfb+Tfl.$$

Then, in Step S12, the initial-engagement-stage duty ratio (control parameter) $D_A$ for the detection point A is calculated, also by interpolation, from the initial duty ratios $D_A$ij corresponding to the four set points Pij that surround the detection point A (controlled variable calculation element). Since an expression similar to the aforesaid expression for the basic elimination time Tfb is used for the calculation of this value, a description of the expression for this case is omitted herein.

Figure 6:
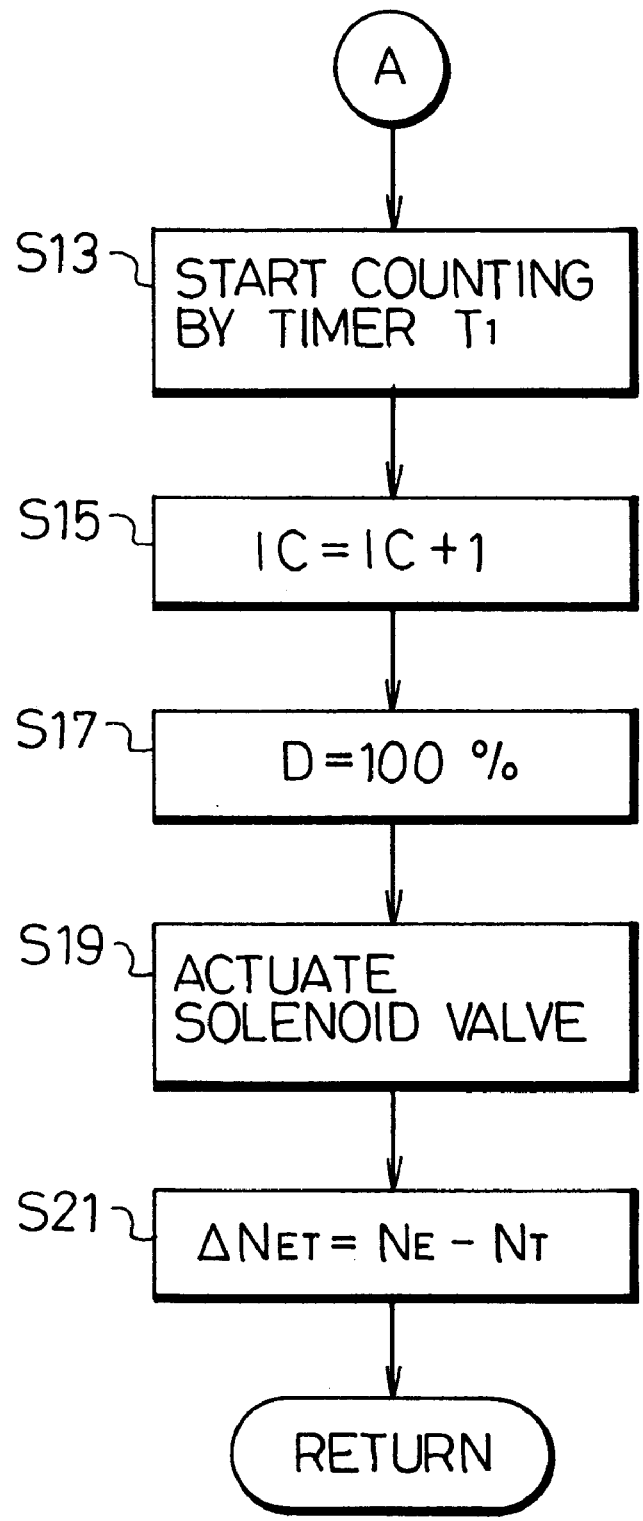
FIG. 6 is a remaining part of the flowchart showing the procedure of the N-D shift control subroutine, continued from FIG. 5.

When the elimination time Tf and the initial-engagement-stage duty ratio $D_A$ are obtained in this manner, the TCU 7 then causes a first-stage timer T1 to start counting in Step S13 of FIG. 6, and adds 1 to the program control variable IC, thereby increasing it to 1, in Step S15. Thereafter, the TCU 7 increases the drive duty ratio D to 100% in Step S17, and then actuates the solenoid valve 34 in Step S19, thereby starting dead stroke elimination (dead stroke elimination element). In Step S21, the TCU 7 calculates an initial deviation $\Delta N_{ET}$ between the engine speed Ne and the turbine speed $N_T$ for the present point of time, stores it in the RAM in Step S21, and returns to the start.

Figure 7:
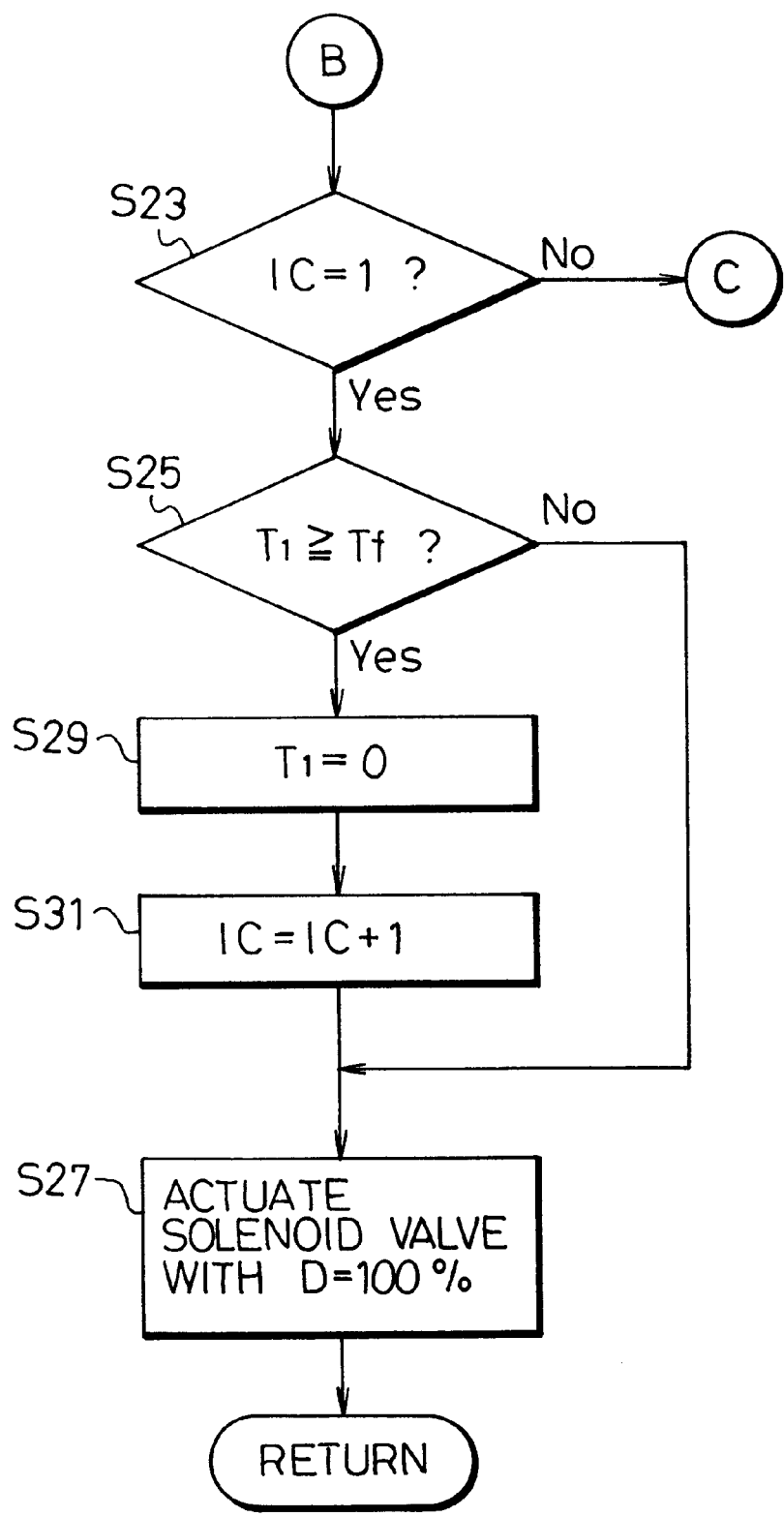
FIG. 7 is a remaining part of the flowchart showing the procedure of the N-D shift control subroutine, continued from FIG. 5.

Since the decision in Step S3 is No this time, the TCU 7, having returned to the start, then determines in Step S23 of FIG. 7 whether or not the program control variable IC is 1 (that is, whether or not the running process is a process in the first stage). Since the decision in this step is Yes, the TCU 7 determines in Step S25 whether or not the count value in the first-stage timer T1 is not smaller than the value of the elimination time Tf, that is, whether or not the first stage is finished. As long as the decision in this step is No, the TCU 7 continues dead stroke elimination with the drive duty ratio D at 100% in Step S27. When the decision changes into Yes, the TCU 7 resets the first-stage timer T1 in Step S29, adds 1 to the program control variable IC, thereby increasing it to 2, in Step S31, and returns to the start.

Figure 8:
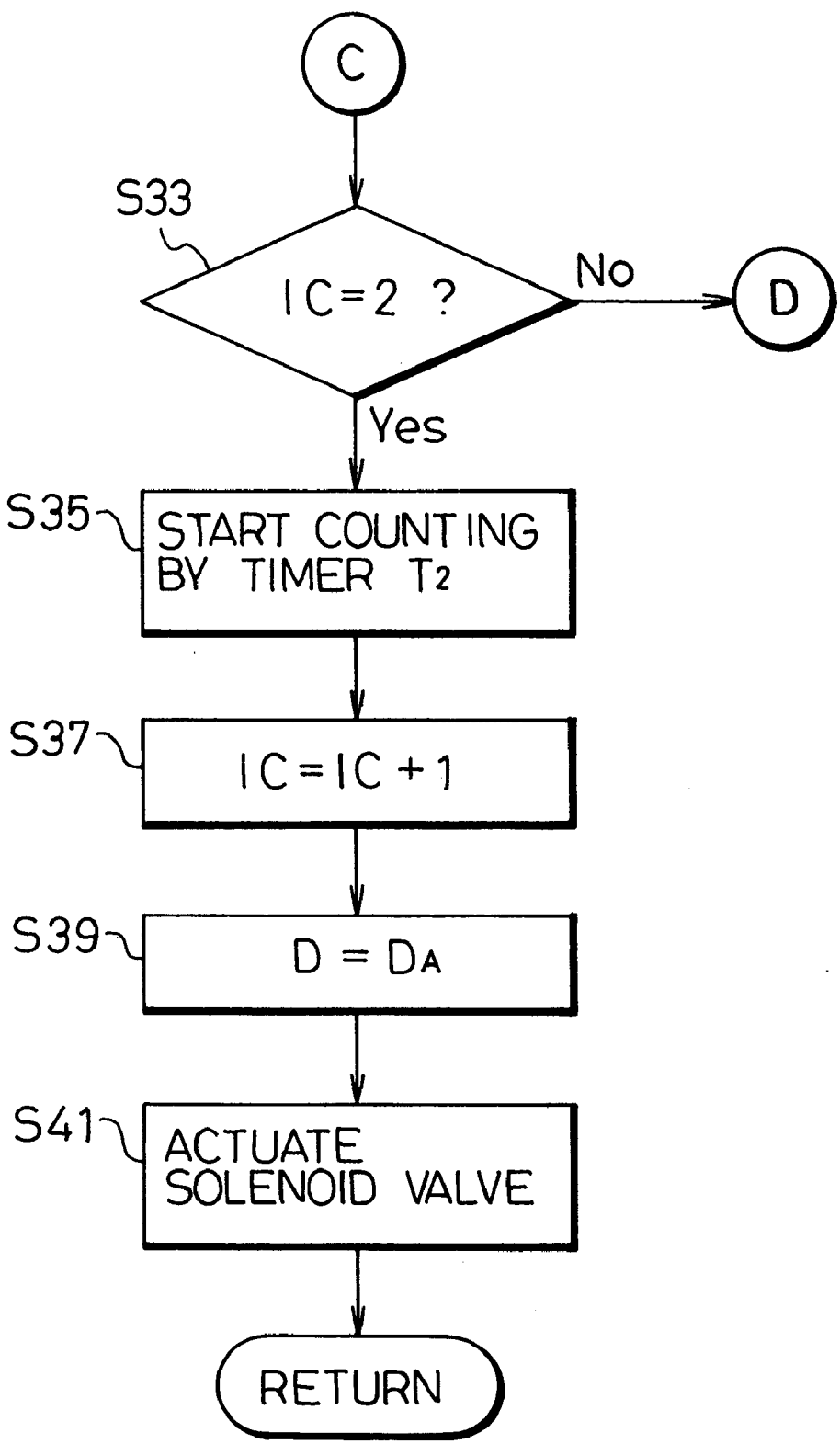
FIG. 8 is a remaining part of the flowchart showing the procedure of the N-D shift control subroutine, continued from FIG. 7.

Since the decision in Step S23 is No this time, the TCU 7, having returned to the start, then determines in Step S33 of FIG. 8 whether or not the program control variable IC is 2 (that is, whether or not the running process is a first process in the second stage). Since the decision in this step is Yes, the TCU 7 causes a second-stage timer T2 to start counting in Step S35, and adds 1 to the program control variable IC, thereby increasing it to 3, in Step S37. Thereafter, the TCU 7 adjusts the drive duty ratio D to the aforesaid initial-engagement-stage duty ratio DA in Step S39 (given hydraulic pressure supply element), actuates the solenoid valve 34 in Step S41, and returns to the start.

Figure 9:
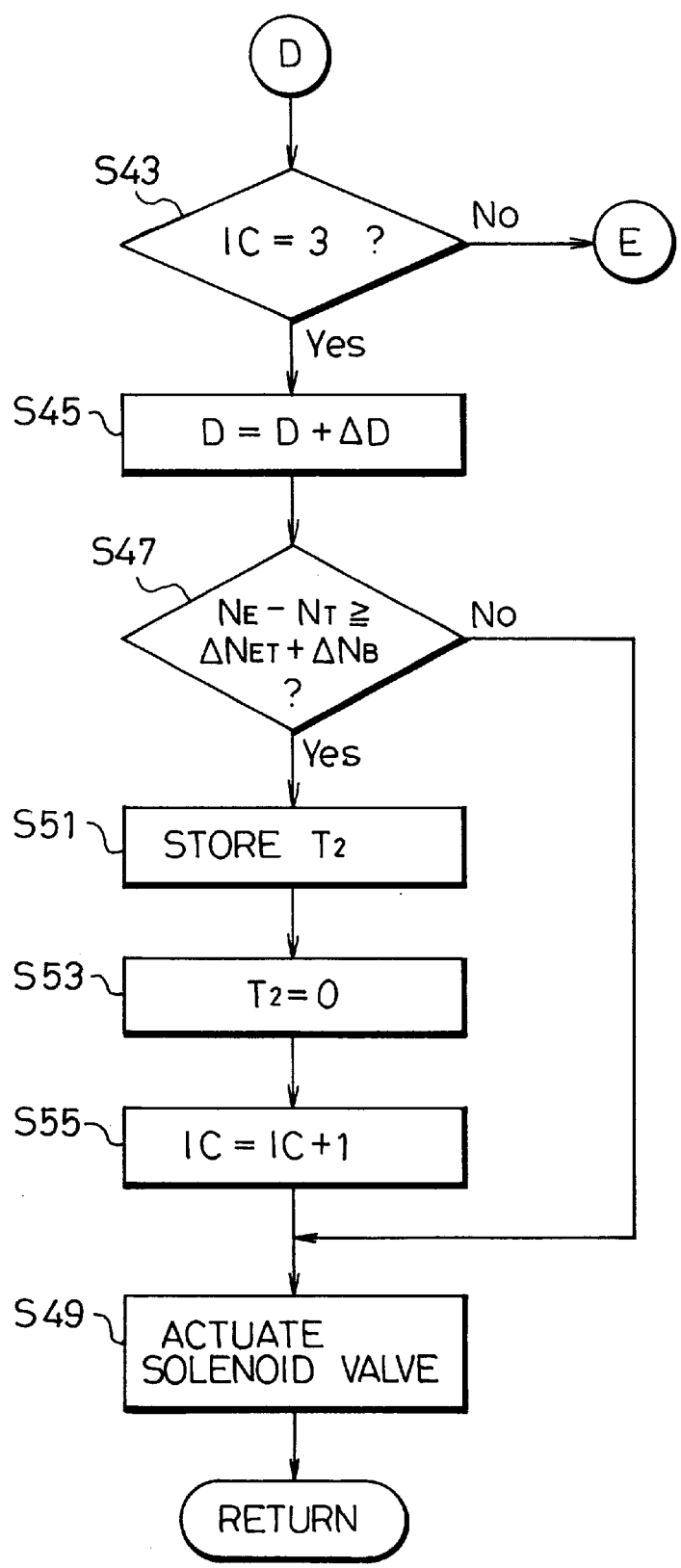
FIG. 9 is a remaining part of the flowchart showing the procedure of the N-D shift control subroutine, continued from FIG. 8.

Since the decision in Step S33 is No this time, the TCU 7, having returned to the start, then determines in Step S43 of FIG. 9 whether or not the program control variable IC is 3 (that is, whether or not the running process is a process in the second stage). Since the decision in this step is Yes, the TCU 7 adds a given increment AD to the drive duty ratio D in Step S45, and then determines in Step S47 whether or not the deviation between the engine speed Ne and the turbine speed $N_T$ is equal to or larger than the sum of the initial deviation $\Delta N_{ET}$ and a given engagement start decision threshold value $\Delta N_B$ (50 rpm according to the present embodiment), that is, whether or not actual gear change is started. As long as the decision in this step is No, the TCU 7 increases the drive duty ratio D in Step S45, and actuates the solenoid valve 34 to accelerate the piston stroke of the hydraulic clutch 20 in Step S49.

When the hydraulic clutch 20 starts to be engaged so that actual gear change is commenced, that is, if the decision in Step S47 is Yes, the TCU 7 is stored with the value in the second-stage timer T2 at that time. This stored value in the timer T2 is used for an elimination time learning correction subroutine, which will be mentioned later. Then, the TCU 7 resets the value in the second-stage timer T2 at 0 in Step S53, adds 1 to the program control variable IC, thereby increasing it to 4, in Step S55, and returns to the start.

Figure 10:
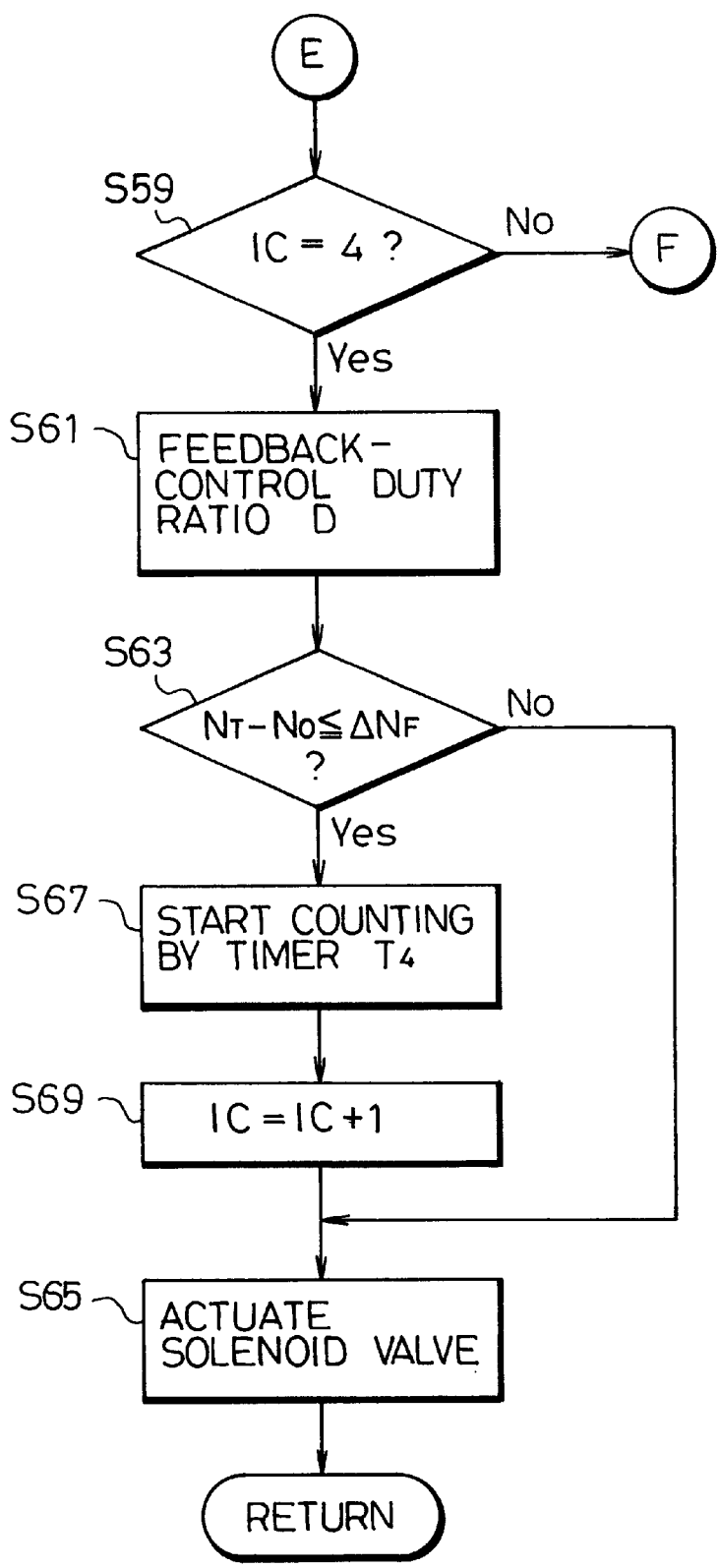
FIG. 10 is a remaining part of the flowchart showing the procedure of the N-D shift control subroutine, continued from FIG. 9.

Since the decision in Step S43 is No this time, the TCU 7, having returned to the start, then determines in Step S59 of FIG. 10 whether or not the program control variable IC is 4 (that is, whether or not the running process is the third stage). Since the decision in this step is Yes, the TCU 7 increases or decreases the drive duty ratio D by feedback control in Step S61 so that a changing rate $\Delta N_T$ of the turbine speed $N_T$ is equal to a given target turbine speed changing rate $\Delta N_{TO}$. Then, the TCU 7 determines in Step S63 whether or not the deviation between the turbine speed $N_T$ and the gear change end speed $N_O$ is not larger than the gear change end decision threshold value $\Delta N_F$ (150 rpm according to the present embodiment). If the decision in this step is No, the TCU 7 continues to actuate the solenoid valve 34 with use of the final drive duty ratio D obtained by feedback control in Step S65. If the deviation between the turbine speed NT and the gear change end speed No is not larger than the gear change end decision threshold value $\Delta N_F$ so that the decision in Step S63 is Yes, the TCU 7 causes a fourth-stage timer T4 to start counting in Step S67, adds 1 to the program control variable IC, thereby increasing it to 5, in Step S69, and returns to the start.

Figure 11:
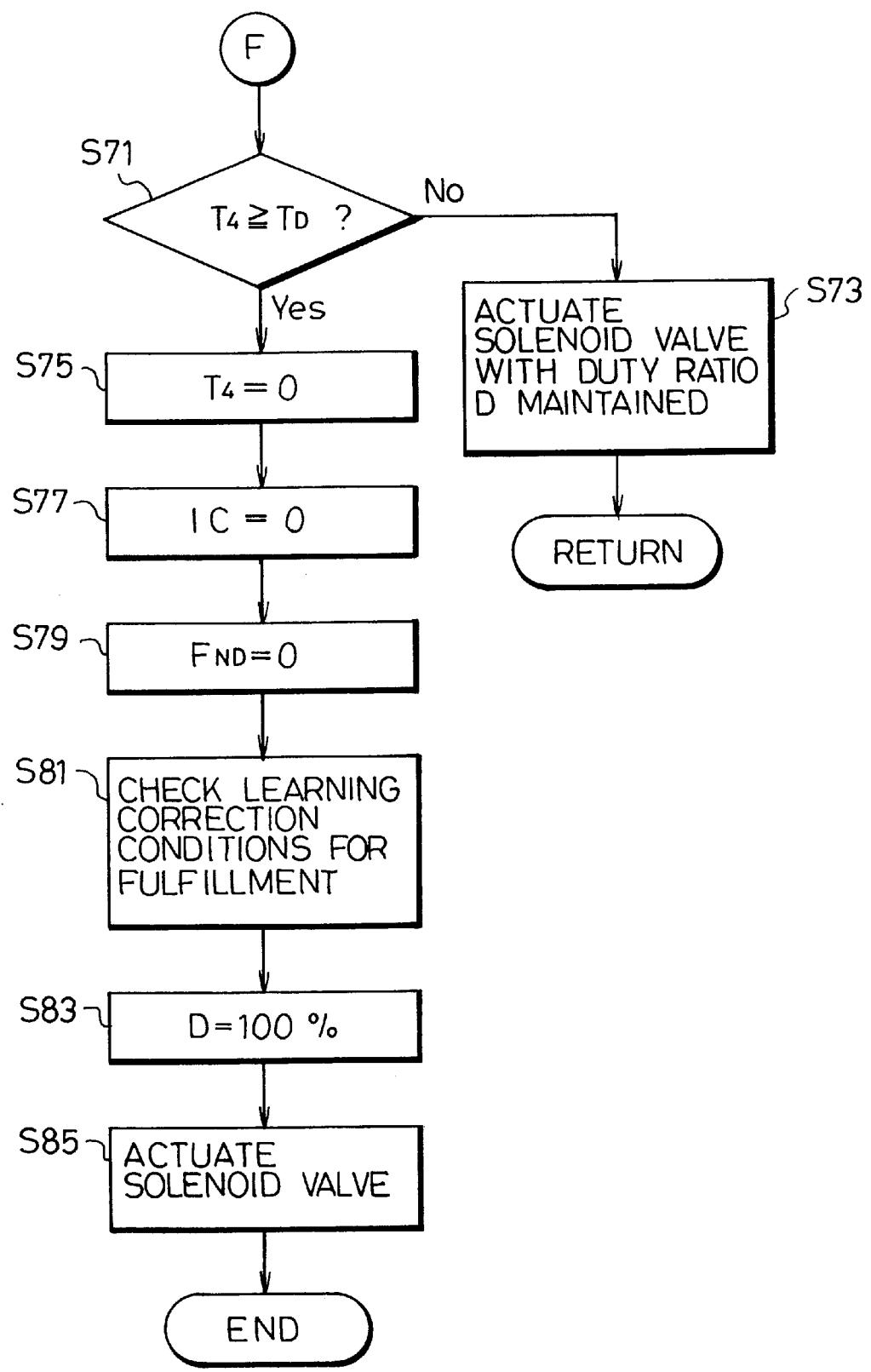
FIG. 11 is a remaining part of the flowchart showing the procedure of the N-D shift control subroutine, continued from FIG. 10.

Since the decision in Step S59 is No this time, the TCU 7, having returned to the start, determines in Step S71 of FIG. 11 whether or not the value in the fourth-stage timer T4 is not smaller than the value of the given standby time $T_D$ (0.2 sec according to the present embodiment). If the decision in this step is No, the TCU 7 continues to actuate the solenoid valve 34 without changing the drive duty ratio D in Step S73.

When the standby time $T_D$ is up so that the decision in Step S71 is Yes, the TCU 7 resets the value in the fourth-stage timer T4, program control variable IC, and N-D-shift-in-process flag $F_{ND}$ at 0 in Steps S75, S77 and S79, respectively. Then, in Step S81, the TCU 7 determines whether or not elimination time learning correction conditions are satisfied, that is, whether or not the vehicle velocity V is at 0 km/h (vehicle is stationary), the throttle opening $\theta_{TH}$ is at 5% or less, the engine speed is at 1,200 rpm or less, the ATF temperature $T_{ATF}$ ranges from −7° C. to 120° C., and the idle switch 12 is on. Thereafter, the TCU 7 sets the drive duty ratio D at 100% in Step S83, and actuates the solenoid valve 34 in Step S85, whereupon the N-D shift control subroutine terminates.

When the N-D shift control subroutine is finished, the TCU 7 executes the elimination time learning correction subroutine.

Figure 12:
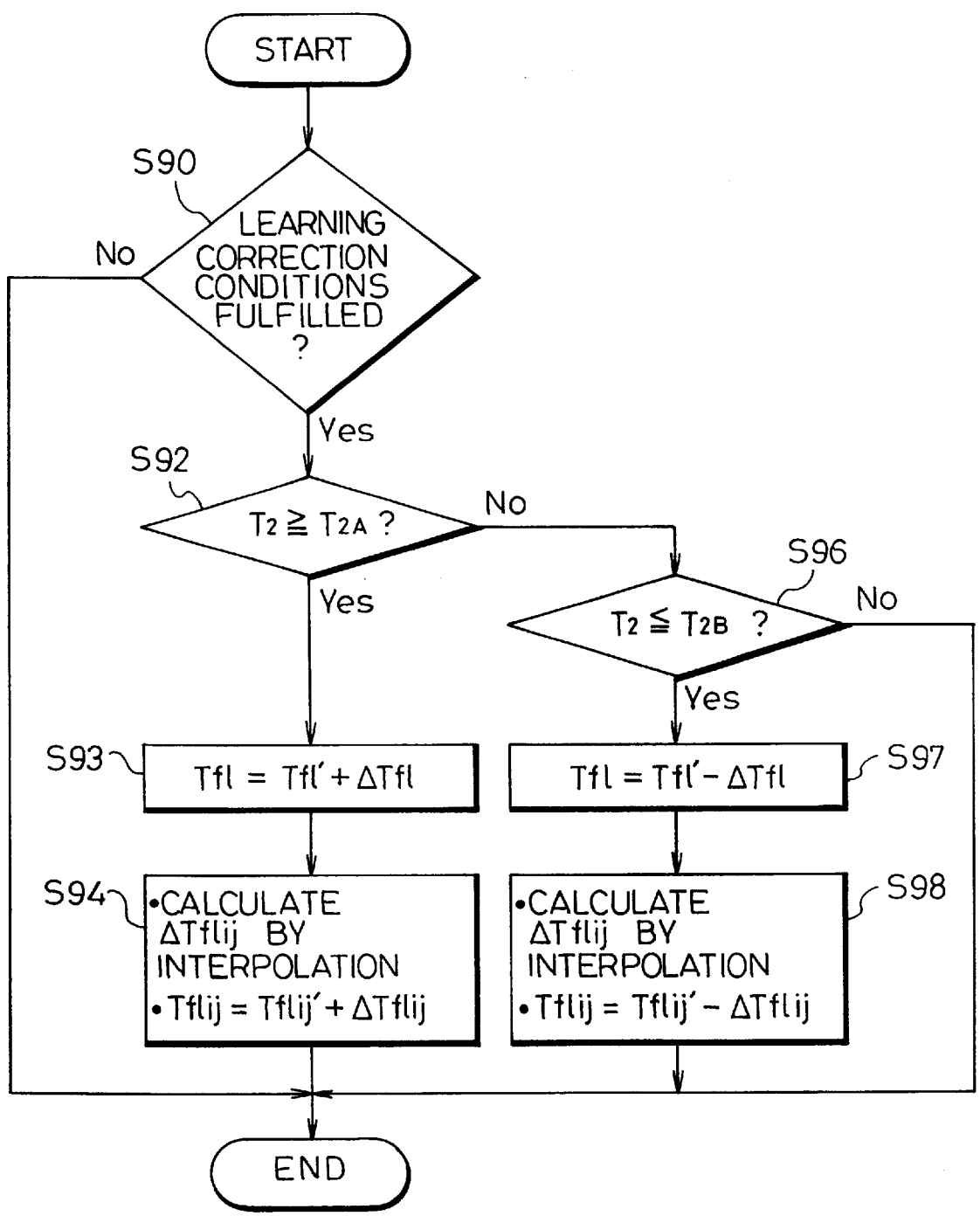
FIG. 12 is a flowchart showing the procedure of an elimination time learning correction subroutine.

When this subroutine is started, the TCU 7 first determines whether or not the elimination time learning correction conditions described in connection with Step S90 of FIG. 12 are are satisfied. If the decision in this step is No, learning correction is not carried out this time. If the decision in Step S90 is Yes, on the other hand, the TCU 7 determines in Step S92 whether or not the value in the second-stage timer T2 stored in the N-D shift control subroutine is not smaller than a given upper-limit decision threshold value $T_{2A}$ (320 ms according to the present embodiment). If the decision in this step is Yes, the TCU 7 advances to Step S93.

In Step S93, the TCU 7 adds a given correction gain ΔTfl (e.g., 16 ms) to learning correction time Tfl' used this time, thereby correcting the value.

In Step S94, the TCU 7 decomposes the given correction gain ΔTfl (e.g., 16 ms) into correction gains ΔTflij for the four set points Pij that surround the detection point A according to the following expression, carrying out the aforesaid interpolation reversely:

$\Delta Tfl(i-1)(j-1) = \Delta Tfl \cdot \{(Nej-Ne)/(Nej-Ne(j-1))\} \cdot \{(T_A i - T_{ATF})/(T_A i - T_A(i-1))\}$, $\Delta Tfl(i-1)j = \Delta Tfl \cdot \{(Ne-Ne(j-1))/(Nej-Ne(j-1))\} \cdot \{(T_A i - T_{ATF})/(T_A i - T_A(i-1))\}$, $\Delta Tfli(j-1) = \Delta Tfl \cdot \{(Nej-Ne)/(Nej-Ne(j-1))\} \cdot \{(T_{ATF} - T_A(i-1))/(T_A i - T_A(i-1))\}$, $\Delta Tflij = \Delta Tfl \cdot \{(Ne-Ne(j-1))/(Nej-Ne(j-1))\} \cdot \{(T_{ATF} - T_A(i-1))/(T_A i - T_A(i-1))\}$.

Since the four set points Pij that surround the detection point A are P32, P33, P42 and P43, in this case, the correction gains ΔTflij are calculated according to the following expression in which subscripts j and i of the above expression are given by i=4 and j=3, as in the aforesaid case. Thus, correction gains ΔTfl32, ΔTfl33, ΔTfl42 and ΔTfl43 are calculated in this case.

$\Delta Tfl32 = \Delta Tfl \cdot \{(Ne3-Ne)/(Ne3-Ne2)\} \cdot \{(T_A 4 - T_{ATF})/(T_A 4 - T_A 3)\}$, $\Delta Tfl33 = \Delta Tfl \{(Ne-Ne2)/(Ne3-Ne2)\} \cdot \{(T_A 4 - T_{ATF})/(T_A 4 - T_A 3)\}$, $\Delta Tfl42 = \Delta Tfl \cdot \{(Ne3-Ne)/(Ne3-Ne2)\} \cdot \{(T_{ATF} - T_A 3)/(T_A 4 - T_A 3)\}$, $\Delta Tfl43 = \Delta Tfl \cdot \{(Ne-Ne2)/(Ne3-Ne2)\} \cdot \{(T_{ATF} - T_A 3)/(T_A 4 - T_A 3)\}$.

In Step S94, the aforesaid correction gains ΔTflij are added to learning correction times Tflij' (Tfl32', Tfl33', Tfl42' and Tfl43' in this case) for the four set points Pij used this time (Tflij=Tflij'+ΔTflij). Thus, in this case, the learning correction times Tflij corresponding to the aforesaid four set points Pij in the correction time map of FIG. 15 are updated on the increase side (learning correction element).

If the decision in Step S92 is No, on the other hand, the TCU 7 determines in Step S96 whether or not the value in the second-stage timer T2 is not smaller than a given lower-limit decision threshold value $T_{2B}$ (288 ms according to the present embodiment). If the decision in this step is Yes, the TCU 7 advances to Step S97.

In Step S97, the TCU 7 subtracts the given correction gain ΔTfl (e.g., 16 ms) from the learning correction time Tfl' used this time, thereby correcting the value.

In Step S98, the TCU 7 decomposes the given correction gain ΔTfl (e.g., 16 ms) into the correction gains ΔTflij for the four set points Pij that surround the detection point A in the same manner as aforesaid, also carrying out the aforesaid interpolation reversely. The correction gains ΔTflij (ΔTfl32, ΔTfl33, ΔTfl42 and ΔTfl43 in this case) are subtracted from the learning correction times Tflij' (Tfl32', Tfl33', Tfl42' and Tfl43' in this case) for the four set points Pij (P32, P33, P42 and P43 in this case) used this time (Tflij=Tflij'−ΔTflij). Thus, the learning correction times Tflij corresponding to the aforesaid four set points Pij in the correction time map of FIG. 15 are updated on the decrease side (learning correction element).

If the decision in Step S96 is No, the elimination time can be concluded to be stable. In this case, therefore, the subroutine is finished without updating the learning correction times Tflij.

In the transmission control apparatus for an automatic transmission according to the present invention, as described above, transmission control under low line pressure, such as the N-D shift, is carried out in the following manner. The point (detection point A) corresponding to the present ATF temperature $T_{ATF}$ and engine speed Ne is defined on the fluid temperature-rotational speed map (see FIG. 13), and those four set points Pij are selected which surround the detection point A and are situated nearest to the point A. The basic elimination times Tfbij, learning correction times Tflij, and initial duty ratios $D_A$ij corresponding to the selected set points Pij are read from their corresponding maps (basic time map, correction time map, and initial duty ratio map), and the elimination time Tf and the initial-engagement-stage duty ratio $D_A$ for the detection point A are finally calculated by interpolation, on the basis of the basic elimination times Tfbij, learning correction times Tflij, and initial duty ratios $D_A$ij.

Thus, in the case of transmission control under low line pressure, such as the N-D shift, in particular, the elimination time Tf and the initial-engagement-stage duty ratio DA can be linearly set at optimum values for the situation (combination of the present ATF temperature $T_{ATF}$ and engine speed Ne) for the transmission control without substantially increasing data stored in the TCU 7. Despite the variation in workmanship between individual parts, such as the transmission body 4, moreover, lowering of shift response and shift shock can be securely prevented with ease.

According to the transmission control apparatus of the invention, moreover, the learning correction times Tflij corresponding to the four set points Pij that are situated nearest to the point A are updated by reversely carrying out the interpolation in the case where the value in the second-stage timer T2 is not between the given upper- and lower-limit decision threshold values $T_{2A}$ and $T_{2B}$.

Accordingly, the elimination times Tf for the set points Pij around the detection point A can be converged on and kept at an appropriate value at all times without any dispersion such as is observed in the conventional arrangement. As a result, even transmission control under low line pressure, such as the N-D shift, can always be carried out properly by interpolating the appropriate learning correction times Tflij for the set points Pij. Thus, lowering of shift response and shift shock can be prevented very securely.

According to the transmission control apparatus of the invention, it is experimentally indicated that the elimination times Tf for the individual set points Pij can be converged on a very appropriate value after about 10 cycles of learning correction even when the initial values of the learning correction times Tflij are 0. Thus, the apparatus of the invention can ensure transmission control with very high reliability.

In obtaining the correction gain ΔTfl according to the embodiment described above, the decision is made on the basis of the two decision threshold values, that is, the upper- and lower-limit decision threshold values $T_{2A}$ and $T_{2B}$. Alternatively, however, the decision threshold values may be increased in number so that the correction gain ΔTfl can be varied depending on them. Thus, more appropriate learning can be effected, so that the learning efficiency is improved.

According to the embodiment described above, moreover, the correction gain ΔTfl is decomposed by reverse interpolation into the correction gains ΔTflij for the four set points Pij that surround the detection point A, and learning correction is carried out in a manner such that the learning correction times Tflij corresponding to the four set points Pij are individually updated by adding or subtracting the correction gains ΔTflij to or from the learning correction times Tflij' for the set points Pij used this time. Alternatively, however, the learning correction times Tflij may be subjected to learning correction by decomposing the learning correction time Tfl obtained in Steps S93 and S97 of FIG. 12 directly into the learning correction times Tflij for the four set points Pij through reverse interpolation.

Further, learning correction may be carried out with the same result by directly updating the basic elimination times Tfbij in the form of the map of FIG. 14 in a manner such that the basic elimination times Tfbij include the learning correction times Tflij calculated according to the embodiment described above, that is, the correction gains ΔTflij for the four set points Pij, decomposed by the aforesaid reverse interpolation, are directly added to or subtracted from the basic elimination times Tfbij without using the map shown in FIG. 15.

According to the embodiment described above, furthermore, the length of the elimination time Tf is reflected directly in the second-stage time (time interval between the elimination of the piston dead stroke and the start of actual gear change) T2, so that learning of the elimination time Tf is carried out on the basis of the value of the second-stage time T2. Alternatively, however, the elimination time Tf may be subjected to learning correction in accordance with the time interval between the start and end of actual gear change (between the times c and d in FIG. 4). It may safely be said in this case, however, that the learning based on the second-stage time T2, an open-loop control region, can ensure more accurate correction, since the feedback control causes the time for the gear change to vary.

According to the embodiment described above, moreover, the present invention is applied to the N-D shift. Since the same situation for the N-D shift also occurs in transmission control modes such as an N-R shift, coast-downshift immediately before stopping of the vehicle, power-off upshift, etc., the invention may be also applied to these control modes.

In the embodiment described above, moreover, only the elimination time Tf is learned by subjecting the learning correction times Tflij to learning correction. However, some other control parameters, such as the initial-engagement-stage duty ratio $D_A$, may be also subjected to like learning correction.

According to the embodiment described herein, furthermore, the control parameters are obtained with reference to the fluid temperature-rotational speed map of FIG. 13 based on the ATF temperature information $T_{ATF}$ and the engine speed information Ne from the fluid temperature sensor 15 and the Ne sensor 16. Alternatively, however, the control parameters may be obtained with reference to a fluid temperature-rotational speed map set on the basis of the ATF temperature information $T_{ATF}$ and the turbine shaft speed $N_T$ Of the torque converter 3 that is used in place of the engine speed information Ne. In this case, the $N_T$ sensor 13 serves as the rotational speed detecting element.

What is claimed is:

1. An apparatus for controlling an automatic transmission of an engine, the apparatus comprising:
   at least one detector structured and arranged to detect at least one operating characteristic of the engine; and
   a controller that identifies at least two control values based on the operating characteristic detected, and determines an operating state for the automatic transmission by interpolating with respect to the at least two control values.

2. The apparatus of claim 1, wherein the detector comprises a fluid temperature detecting element, and the operating characteristic detected by the fluid temperature detecting element is an automatic transmission fluid temperature.

3. The apparatus of claim 1, wherein the detector comprises a rotational speed detecting element, and the operating characteristic detected by the rotational speed detecting element is a rotational speed of at least one of the engine and a hydraulic pump for generating hydraulic pressure.

4. The apparatus of claim 1, wherein the detector comprises a fluid temperature detecting element and a rotational speed detecting element, and the operating characteristic detected by the fluid temperature detecting element is an automatic transmission fluid temperature, and the operating characteristic detected by the rotational speed detecting element is a rotational speed of at least one of the engine and a hydraulic pump for generating hydraulic pressure.

5. The apparatus of claim 1, wherein the controller comprises:

a selection element structured and arranged to define a detected operating state based on the operating characteristic detected by the detector, and to identify several similar operating states based on the detected operating state; and a controlled variable calculation element that determines the operating state for the automatic transmission by interpolating with respect to the at least two similar operating states identified.

6. The apparatus of claim 1, further comprising:

a storage element that stores control values corresponding to several different operating characteristics of the engine, wherein the controller comprises:

a selection element that selects at least two of the control values from among those stored in the storage element based on the operating characteristic detected, and a control variable calculation element that calculates the control parameter by interpolating the control values identified by the selection element.

7. The apparatus of claim 6, wherein the storage element stores the control values in the form of a map, and where the selection element defines a detection point on the map based on the operating characteristic detected and selects at least two of the control values from among those stored in the storage element by selecting control values of the map which surround the defined detection point.

8. An apparatus for controlling an automatic transmission of an engine, the apparatus comprising:

means for detecting at least one operating characteristic of the engine; and means for identifying at least two control values based on the operating characteristic detected, and determining an operating state for the automatic transmission by interpolating with respect to the at least two control values.

9. The apparatus of claim 8, wherein the detector comprises a fluid temperature detecting element and a rotational speed detecting element, and the operating characteristic detected by the fluid temperature detecting element is an automatic transmission fluid temperature, and the operating characteristic detected by the rotational speed detecting element is a rotational speed of at least one of the engine and a hydraulic pump for generating hydraulic pressure.

10. The apparatus of claim 8, further comprising:

a storage element that stores control values corresponding to several different operating characteristics of the engine, wherein the controller comprises:

a selection element that selects at least two of the control values from among those stored in the storage element based on the operating characteristic detected, and a control variable calculation element that calculates the control parameter by interpolating the control values identified by the selection element.

11. The apparatus of claim 10, wherein the storage element stores the control values in the form of a map, and where the selection element defines a detection point on the map based on the operating characteristic detected and selects at least two of the control values from among those stored in the storage element by selecting control values of the map which surround the defined detection point.

12. A transmission control apparatus for an automatic transmission interposed between an engine and a driving wheel, the control apparatus comprising:

a hydraulic pressure control element that uses a control parameter to control a hydraulic pressure supplied to a frictional element for engagement, whereby a predetermined transmission stage for the automatic transmission is established;

a fluid temperature detecting element for detecting the fluid temperature of the automatic transmission;

a rotational speed detecting element for detecting the rotational speed of at least one of the engine and a hydraulic pump for generating the hydraulic pressure;

a storage element for storing, in the form of a map, control values for the control parameter corresponding to a plurality of set points set in accordance with the fluid temperature of the automatic transmission and the rotational speed of the engine or the hydraulic pump;

a selection element for defining a detection point on the map in accordance with results of detection from the fluid temperature detecting element and the rotational speed detecting element and for selecting points, among the set points, which surround the detection point; and a controlled variable calculation element for obtaining control values for the selected points from the map and calculating the controlled variable of the control parameter corresponding to the detection point by interpolating the control values.

13. The apparatus according to claim 12, wherein said control parameter is a time during which a piston dead stroke of the frictional element for engagement is eliminated.

14. The apparatus according to claim 12, wherein said hydraulic pressure control element comprises a dead stroke elimination element for eliminating a piston dead stroke of the frictional element for engagement by supplying a total pressure to the frictional element and a given hydraulic pressure supply element for supplying a given hydraulic pressure to the frictional element for engagement after the piston dead stroke is eliminated, and said control parameter is the given hydraulic pressure.

15. The apparatus according to claim 12, wherein said controlled variable calculation element comprises a learning correction element for calculating a learning correction value for the control parameter corresponding to the detection point and reflecting the learning correction value in the control values for the selected points, and said controlled variable calculation-element calculates the controlled variable of the control parameter by interpolating the control values reflective of the learning correction value.

16. The apparatus according to claim 15, wherein said learning correction element calculates the learning correction value in accordance with a time interval between the point of time that the piston dead stroke of a frictional element for engagement is eliminated and the time for the start of actual gear change.

17. A transmission control method for an automatic transmission interposed between an engine and a driving wheel, the control method comprising:

(a) detecting the fluid temperature of the automatic transmission;

(b) detecting the rotational speed of the engine or a hydraulic pump for generating the hydraulic pressure;

(c) storing, in the form of a map, control values for a control parameter corresponding to a plurality of set points set in accordance with the fluid temperature of the automatic transmission and the rotational speed of the engine or the hydraulic pump;

(d) defining a detection point on the map based on the detected fluid temperature and rotational speed, and selecting those points, among the set points, which surround the detection point;

(e) obtaining control values for the selected points from the map and calculating a controlled variable of the control parameter corresponding to the detection point by interpolating the control values; and (f) controlling by means of the control parameter a hydraulic pressure supplied to a frictional element for engagement, whereby a predetermined transmission stage for the automatic transmission is established.

18. The method according to claim 17, wherein said step (f) comprises (g) using as the control parameter a time during which the piston dead stroke of the frictional element for engagement is eliminated.

19. The method according to claim 17, wherein said step (f) comprises (h) eliminating the piston dead stroke of a frictional element for engagement by supplying a total pressure to the frictional element, (i) supplying a given hydraulic pressure to the frictional element for engagement after the piston dead stroke is eliminated, and (j) using the given hydraulic pressure as the control parameter.

20. The method according to claim 17, wherein said step (e) comprises (k) calculating a learning correction value for the control parameter corresponding to the detection point and reflecting the learning correction value in the control values for the selected points, and (l) calculating the controlled variable of the control parameter by interpolating the control values reflective of the learning correction value.

21. The method according to claim 20, wherein said step (k) comprises (m) calculating the learning correction value in accordance with a time interval between the point of time that the piston dead stroke of a frictional element for engagement is eliminated and the time for the start of actual gear change.

* * * * *